United States Patent Office 3,833,662
Patented Sept. 3, 1974

3,833,662
PROCESS FOR THE MANUFACTURE OF
DIALKYLPHOSPHINE OXIDES
Horst Staendeke, Bruhl, and Werner Klose, Hurth-Knapsack, Germany, assignors to Knapsack Aktiengesellschaft, Knapsack, near Cologne, Germany
No Drawing. Filed Nov. 9, 1972, Ser. No. 305,135
Claims priority, application Germany, Nov. 12, 1971,
P 21 56 203.8
Int. Cl. C07f 9/28
U.S. Cl. 260—606.5 P
13 Claims

ABSTRACT OF THE DISCLOSURE

Production of dialkylphosphine oxides of the general formula:

in which R and R' stand for identical or different, straight chain or branched alkyl groups containing between 1 and 3 carbon atoms. The oxides are made by oxidizing a hydrohalic acid solution of a dialkylphosphine with an oxidant having an oxidizing power greater than that of atmospheric oxygen. The oxidant is more particularly added substantially in the stoichiometric proportions necessary to effect the oxidation to dialkylphosphine oxide.

---

The present invention relates to a process for the manufacture of dialkylphosphine oxides of the general formula:

in which R and R' stand for identical or different, straight chain or branched, unsubstituted alkyl groups having between 1 and 3 carbon atoms.

Dialkylphosphine oxides are interesting intermediates for the production of surfactants and agents imparting fire-proofness to plastics and biocides. Heretofore, they have been made predominantly by the reaction of Grignard compounds with dialkyl phosphites:

$R_2^2P(O)H + 2MgX(OR^1) + MgX(OH) + R^2H$ or by the additive combination of olefins with alkylphosphine oxides in contact with catalysts.

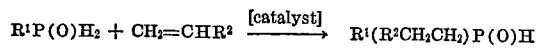

It has also been reported that bis-(2-cyanoethyl)-phosphine oxide can be produced in yields of 90% by flowing air at a temperature substantially of 60° C. through an alcoholic solution of the corresponding phosphine. This process can, however, not be used for the oxidation of unsubstituted dialkylphosphines containing between 1 and 3 carbon atoms in the alkyl group. The reason for this resides in the fact that these phosphines undergo self-ignition in contact with air or oxygen, or the air oxidation is found predominantly to result in the direct formation of the corresponding phosphinic acids, via the stage of phosphine oxides.

We have now unexpectedly found that the difficulties reported above can be avoided and dialkylphosphine oxides can be produced by subjecting dialkylphosphines, of which the unsubstituted alkyl groups contain between 1 and 3 carbon atoms, to oxidation using an oxidizing agent with an oxidizing power greater than that of atmospheric oxygen, the oxidizing agent being added to a dialkylphosphine solution in a hydrohalic acid substantially in the stoichiometric proportions necessary to effect the oxidation of the dialkylphosphine to dialkylphosphine oxide.

The reaction should be carried out at temperatures between 0 and 100° C., preferably between 20 and 30° C., and a dialkyl phosphine solution having a concentration between 1 and 50 weight percent, preferably between 5 and 20 weight percent, should be used as the starting material.

To this end, it is good practice by the introduction of dialkylphosphine into a concentrated hydrohalic acid to prepare a concentrated solution of dialkylphosphine in the hydrohalic acid and, prior to using the solution so made, to dilute it with a solvent, which is miscible with water and substantially inert with respect to the starting components, so as to obtain a solution of desirable concentration.

The concentrated dialkylphosphine solutions should most conveniently be diluted with water and should contain an acid fraction between 1 and 40 weight percent, preferably between 5 and 10 weight percent. The preferred hydrohalic acid is hydrochloric acid and the preferred oxidant is chlorine or an aqueous hydrogen peroxide solution. The hydrogen peroxide solution should have a strength between 0.1 and 40 weight percent, preferably between 1 and 10 weight percent.

The phosphines have unexpectedly been found to be considerably less reactive in a hydrohalic acid solution. As a result, it is possible to avoid the reaction of the phosphines with atmospheric oxygen at room temperature and to effect a controlled oxidation of the phosphines with stronger oxidants.

Even the oxidation of phosphines with air at 60° C. failed to produce significant yields of reaction products. Dimethylphosphine was reacted over a period of 12 hours at 60° C. and a reaction product was obtained which merely contained 2.5% of dimethylphosphine oxide and 1.5% of dimethylphosphinic acid. This was determined by nuclear magnetic resonance spectroscopy (NMR-spectroscopy).

A stronger oxidation was effected with the use of chlorine. For example, dimethylphosphine was reacted over a period of 4 hours at room temperature and as much as 37% of dimethylphosphine oxide together with 2% of dimethylphosphinic acid were found to have been formed (NMR-spectroscopy).

In order to ensure and control the addition of stoichiometric proportions of chlorine and thereby to avoid the introduction of an excess of oxidant, which would readily cause further oxidation of the phosphine oxide to phosphinic acid, it would be necessary, however, to subject the reaction solution to frequent NMR-testing. To avoid this, the phosphine was dissolved in hydrochloric acid and hydrogen peroxide was used as a chlorine generator. As a result, it was readily possible by the addition of a hydrogen peroxide solution with a certain concentration of $H_2O_2$ therein to establish any desirable concentration of nascent chlorine.

The reaction solutions made in accordance with the process of this invention were subjected to $^1H$-NMR-analysis and found to contain the following phosphorus compounds in the following proportions:

| | Percent |
|---|---|
| Dialkylphosphine oxide | 90–95 |
| Dialkylphosphinic acid | 3–8 |
| Dialkylphosphine | 0–3 |

The aqueous dialkylphosphine oxide solutions are transformed into crystalline anhydrous material. Quite generally, the solution is neutralized substantially at room temperature with the use of an alkaline liquor having a strength between 20 and 50 weight percent, preferably 50 weight percent, and distilled under reduced pressure, for example in a rotary evaporator under 12–25 mm. of mercury, up to an internal temperature of approximately 80° C. Following this, the residue is mixed with a suitable solvent, for example benzene. Water residues, which may be found to have been retained, are distilled off azeotropically together with the solvent.

The precipitated alkali metal halide is filtered off, the filtrate is freed from the solvent by distillation under reduced pressure, and dialkylphosphine oxide is obtained.

EXAMPLE 1

Oxidation with air

A 1 liter reaction flask fitted with gas inlet, stirrer, thermometer and reflux condenser was charged with 200 milliliters of a solution, which contained 28 weight percent of dimethylphosphine and 20 weight percent of HCl, and the solution was diluted with 200 milliliters of water. Following this, 10–15 liters/hr. of air were introduced with agitation into the dilute solution.

| Reaction time (hours): | Reaction temperature (° C.) | DMP* (percent)** | DMPO (percent) | MIS (percent) |
|---|---|---|---|---|
| 6 | 20–30 | >99 | <1 | <1 |
| 8 | 20–30 | >99 | <1 | <1 |
| 10 | 20–30 | >99 | <1 | <1 |
| 12 | 20–30 | >99 | <1 | <1 |
| 4 | 60 | >99 | <1 | <1 |
| 8 | 60 | 97 | 1.7 | 1.2 |
| 12 | 60 | 96 | 2.5 | 1.5 |

*In the above table, the following abbreviations are used for the following compounds:
DMP = dimethylphosphine
DMPO = dimethylphosphine oxide
MIS = dimethylphosphinic acid
**The reaction solutions were subjected to $^1$H-NMR-analysis. The figures indicate the proportions to phosphorus compounds obtained, in weight percent.

EXAMPLE 2

Oxidation with chlorine

A 1 liter reaction flask fitted with gas inlet, stirrer, thermometer and reflux condenser was charged with 200 milliliters of a solution, which contained 28 weight percent of dimethylphosphine and 20 weight percent of HCl, and the solution was diluted with 400 milliliters of water and 400 milliliters of concentrated hydrochloric acid, respectively. Following this, 10–15 liters/hr. of a chlorine/nitrogen-mixture, which consisted of 1 part of chlorine and 1–1.5 parts of nitrogen, was introduced with agitation into the dilute solution.

The reaction time was 4 hours and the reaction temperature was between 20 and 30° C.

| Acid concentration (percent HCl) | Percent | | |
|---|---|---|---|
| | DMP | DMPO | MIS |
| About 7 | 79 | 1 | 8 |
| About 30 | 63 | 37 | 2 |

EXAMPLE 3

Oxydation with a hydrogen peroxide solution (a) Dependency of DMPO-yield on concentration of DMP-solution. A 1 liter reaction flask fitted with thermometer, stirrer, reflux condenser and dropping funnel was charged with 200 milliliters of a solution, which contained 28 weight percent of DMP and 20 weight percent of HCl, and the solution was diluted with varying proportions of water. Following this, substantially stoichiometric proportions of an aqueous hydrogen peroxide solution (80 milliliters of a 38 weight percent $H_2O_2$-solution/500 milliliters) was added with agitation, within a period of substantially 1 hour.

The reaction temperature was between 20 and 30° C. and concentration of the hydrogen peroxide solution was 7 weight percent of $H_2O_2$.

| DMP-solution (wt. percent DMP) | Acid concentration (percent HCl)* | Percent | | |
|---|---|---|---|---|
| | | DMP | DMPO | MIS |
| 13 | About 10... About 5 | 3 | 89 | 8 |
| 8 | About 7... About 4 | <1 | 93 | 7 |
| 6 | About 5... About 3 | <1 | 95 | 5 |
| 4.5 | About 4........do | <1 | 96 | 4 |

* The figures in the left hand portion indicate the acid concentration in the reaction solution at the start of the oxidation, and the figures in the right hand portion indicate the acid concentration, at the end of the reaction.

(b) Dependency of DMPO-yield on the reaction temperature and acid concentration: The experiments were carried out under the conditions reported in Example 3a.

The DMP-solution had a concentration of 13 weight percent and the hydrogen peroxide solution had a concentration of 3.5 weight percent of $H_2O_2$.

| Reaction temperature (° C.) | Acid concentration (percent HCl) | Percent | | |
|---|---|---|---|---|
| | | DMP | DMPO | MIS |
| 20–30 | About 10.. About 3 | >1 | 95 | 5 |
| >95 | ....do....do | 7 | 78 | 15 |
| 20–30 | About 27.. About 9 | 7 | 76 | 17 |
| >95 | ....do....do | 16 | 59 | 25 |

(c) Dependency of DMPO-yield on the hydrogen peroxide concentration: The experiments were made under the conditions reported in Example 3a. The reaction temperature was 20–30° C. and the concentration of the DMP-solution was 13 weight percent of DMP. The initial acid concentration, which was about 10 weight percent of HCl at the start of the reaction, was found to have dropped down to substantially 3 weight percent, at the end of the reaction.

| $H_2O_2$-concentration (wt. percent) | Percent | | |
|---|---|---|---|
| | DMP | DMPO | MIS |
| 11 | 7 | 83 | 10 |
| 7 | 3 | 89 | 8 |
| 3.5 | <1 | 95 | 5 |

We claim:

1. A process for the manufacture of dialkylphosphine oxides of the general formula:

in which R and R' stand for identical or different, straight chain or branched alkyl groups containing between 1 and 3 carbon atoms, which comprises oxidizing a hydrohalic acid solution of a dialkylphosphine with an oxidant having an oxidizing power greater than that of atmospheric oxygen, the oxidant being added substantially in the stoichiometric proportions necessary to effect the oxidation to dialkylphosphine oxide.

2. The process as claimed in claim 1, wherein the oxidation is carried out at temperatures between 0 and 100° C.

3. The process as claimed in claim 2, wherein the oxidation is carried out at at temperatures between 20 and 30° C.

4. The process as claimed in claim 1, wherein the dialkylphosphine solution has a concentration between 1 and 50 weight percent.

5. The process as claimed in claim 4, wherein the dialkylphosphine solution has a concentration between 5 and 20 weight percent.

6. The process as claimed in claim 4, wherein a concentrated solution of dialkylphosphine in concentrated hydrohalic acid is diluted with a solvent miscible with water and substantially inert with respect to the components in the solution, and the resulting dilute solution of desirable concentration is oxidized.

7. The process as claimed in claim 6, wherein the concentrated dialkylphosphine solution is diluted with water.

8. The process as claimed in claim 1, wherein the dialkylphosphine solution contains between 1 and 40 weight percent of acid.

9. The process as claimed in claim 8, wherein the dialkylphosphine solution contains between 5 and 10 weight percent of acid.

10. The process as claimed in claim 1, wherein the hydrohalic acid is hydrochloric acid.

11. The process as claimed in claim 1, wherein the oxidant is chlorine or an aqueous hydrogen peroxide solution.

12. The process as claimed in claim 11, wherein a hydrogen peroxide solution with a concentration between 0.1 and 40 weight percent is used.

13. The process as claimed in claim 12, wherein a hydrogen peroxide solution with a concentration between 1 and 10 weight percent is used.

References Cited

UNITED STATES PATENTS

| | | | |
|---|---|---|---|
| 2,953,596 | 9/1960 | Rauhut et al. | 260—606.5 P |
| 3,145,234 | 8/1964 | Buckler et al. | 260—606.5 P |

DANIEL E. WYMAN, Primary Examiner

A. P. DEMERS, Assistant Examiner